R. G. Pine,

Sawing Stone.

N° 13,762.  Patented Nov. 6, 1855.

UNITED STATES PATENT OFFICE.

R. G. PINE, OF NEWARK, NEW JERSEY.

MARBLE-SAWING MACHINE.

Specification of Letters Patent No. 13,762, dated November 6, 1855.

*To all whom it may concern:*

Be it known that I, ROBERT G. PINE, of Newark, in the county of Essex and State of New Jersey, have invented a new and useful Machine for Sawing Marble in Polygonal Taper Form; and I do hereby declare that the following is a full, clear, and exact description of the same, reference being had to the annexed drawings, making a part of this specification, in which—

Figure 1:
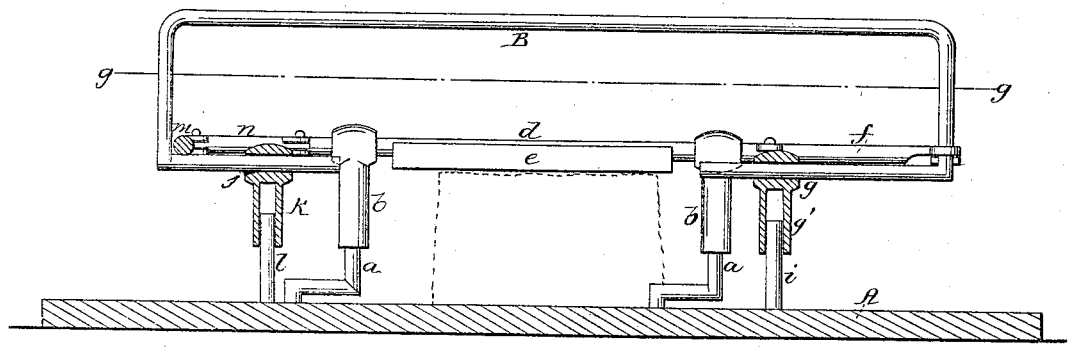
Figure 2:
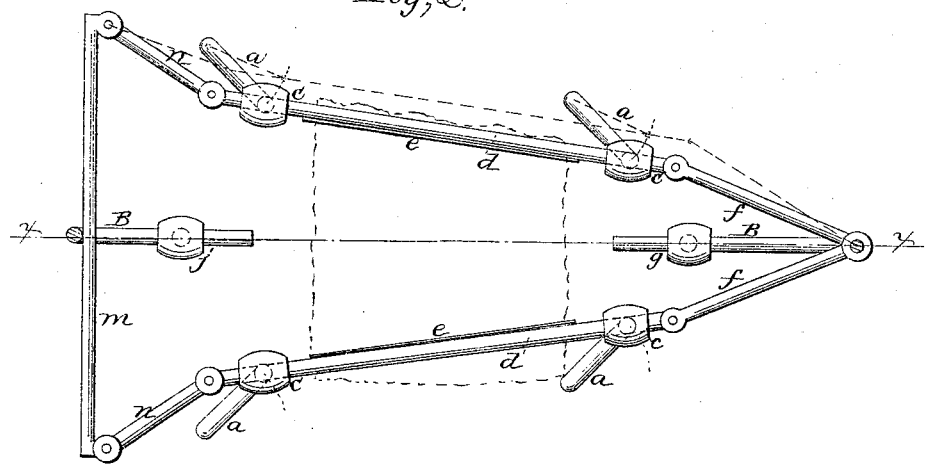

Figure 1, is a longitudinal vertical section of my improvement, $x$, $x$, Fig. 2, showing the plane of section. Fig. 2, is a horizontal section of ditto, $y$, $y$, Fig. 1, showing the plane of section.

Similar letters of reference indicate corresponding parts in the two figures.

The nature of my invention consists in having the saws attached to rods which work in sockets or guides the ends of the rods being attached to the frame by jointed arms as will be presently shown and described whereby blocks of marble may be sawed in polygonal taper form.

To enable others skilled in the art to fully understand and construct my invention, I will proceed to describe it.

A, represents a bed plate or platform in which rods $a$, are placed, said rods being bent in the form of cranks so that their upper parts may be turned nearer to or farther apart from each other. On the upper parts of the rods $a$, sockets $b$, are placed, said sockets being fitted loosely on the rods $a$. The upper ends of the sockets $b$, have eyes or apertures $c$, made through them in which rods $d$, work, the eyes or apertures forming guides for the rods $d$. These rods have saws $e$, attached to them, a saw to each rod. The saws being between the sockets $b$. The front ends of the rods $d$, are connected by jointed arms $f$, to the front end of a frame B, which may be formed of a rod having its front and back ends bent as shown clearly in Fig. 1. The lower part of the frame B, at its front end works in a guide $g$, which is attached to a socket $g'$, placed on a rod $i$, permanently secured to the bed plate A. The lower part of the back end of the frame B, works in a guide $j$, attached to a socket $k$, placed on a rod $l$, also permanently secured to the bed plate A.

The back ends of the rods $d$, $d$, are connected to the ends of a bar $m$, by jointed arms $n$, $n$, and the center of the bar $m$, is attached to the back part of the frame B, as clearly shown in Fig. 2.

The guides $g$, $j$, cause the frame B, to work in a right line, and by turning the rods $a$, in proper position the rods $d$, may be made to work parallel with each other, or by turning the two front rods $a$, inward or toward each other the rods $d$, will work in right lines obliquely with each other, the jointed arms $f$, $n$, compensating for the obliquity of the rods $d$.

The block of marble to be sawed is placed upon the bed plate A, the saws $e$, rods $d$, and sockets $b$, $b$, $g'$, $k$, being raised so that the block of marble may be placed underneath the saws which rest upon the marble. A reciprocating motion is then given the frame B, in any proper manner and the saws $e$, $e$, will cut the two opposite sides of the marble block in taper form, the two front guides being set nearer to each other than the two back guides. The saws feed themselves to the work by their own gravity. When the two opposite sides of the marble are sawed the block is turned upon the bed plate and the two remaining sides are sawed.

Having thus described my invention, what I claim as new and desire to secure by Letters Patent, is,

The frame B, connected by jointed rods $f$, $n$, to rods $d$, $d$, working in sockets $b$, $b$, which are fitted loosely on rods $a$, when the above parts are all constructed and arranged in the manner and for the purpose set forth.

ROBERT G. PINE.

Witnesses:
J. W. COOMBS,
WM. TUSCH.